Figure 3:
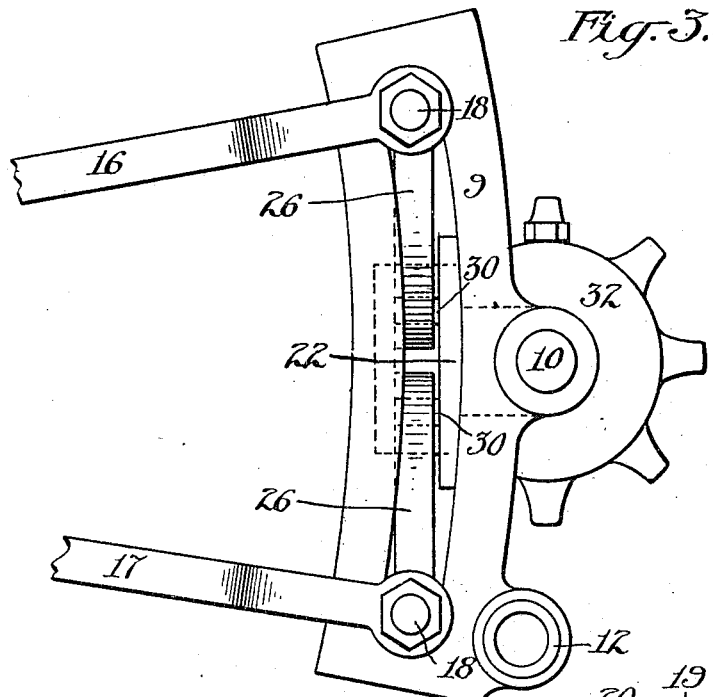

No. 831,857. PATENTED SEPT. 25, 1906.
G. T. HACKLEY.
DRIVING GEAR.
APPLICATION FILED DEC. 11, 1905.
3 SHEETS—SHEET 1.
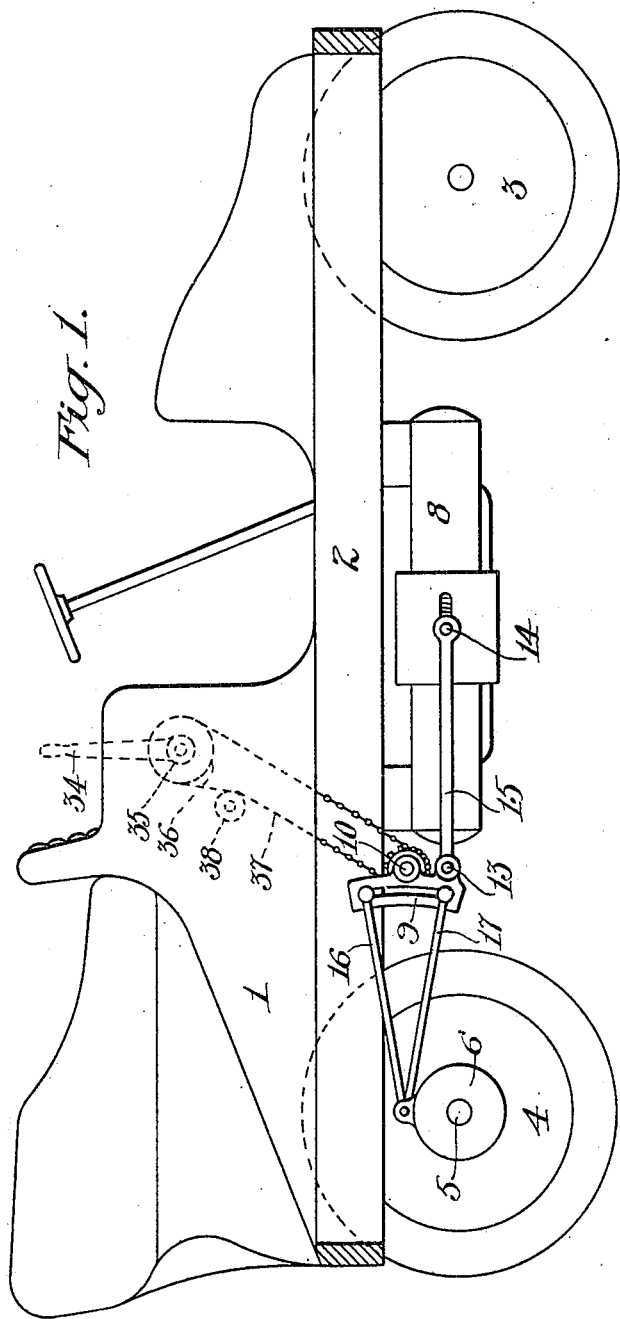
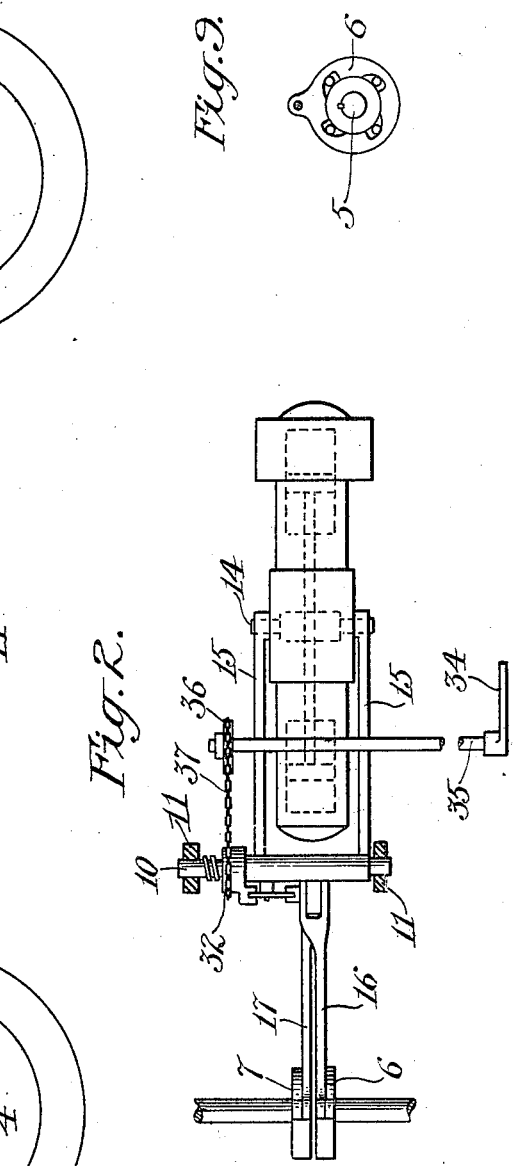
Witnesses:
Frank L. A. Graham
F. Mansfield
Inventor:
George T. Hackley
by Townsend Symes Hackley & Knight
His attys.

No. 831,857. PATENTED SEPT. 25, 1906.
G. T. HACKLEY.
DRIVING GEAR.
APPLICATION FILED DEC. 11, 1905.

3 SHEETS—SHEET 2.

Witnesses:
Frank L. A. Graham
J. M. Mansfield

Inventor:
George T. Hackley
by Townsend Lyon Hackley & Knight
His attys.

No. 831,857. PATENTED SEPT. 25, 1906.
G. T. HACKLEY.
DRIVING GEAR.
APPLICATION FILED DEC. 11, 1905.
3 SHEETS—SHEET 3.
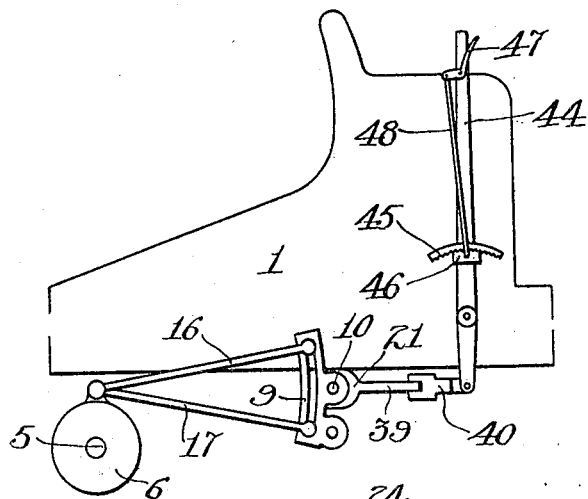
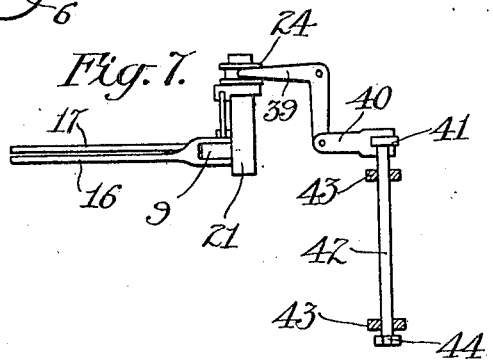
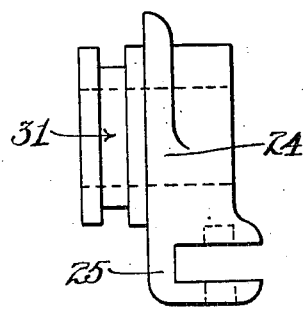
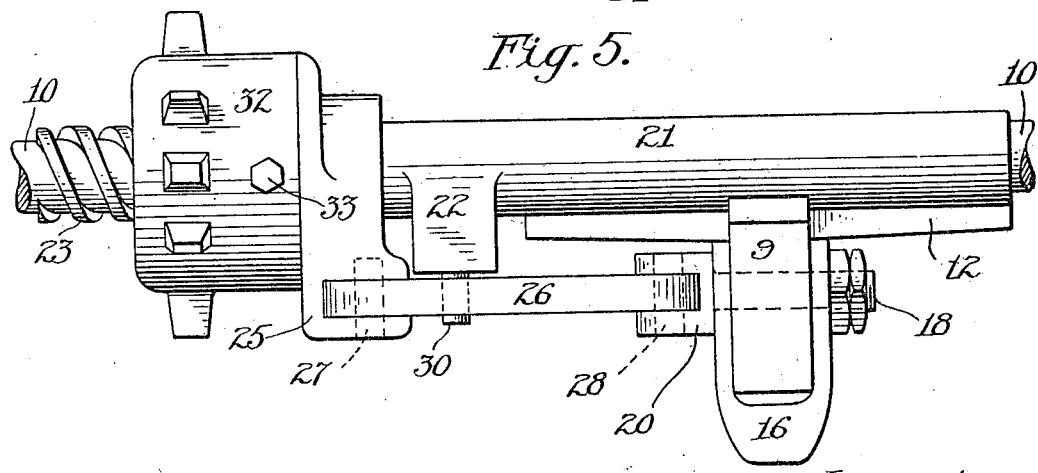

UNITED STATES PATENT OFFICE.

GEORGE T. HACKLEY, OF LOS ANGELES, CALIFORNIA, ASSIGNOR TO DIRECT DRIVE POWER TRANSMISSION CO., OF LOS ANGELES, CALIFORNIA, A CORPORATION OF CALIFORNIA.

DRIVING-GEAR.

No. 831,857.   Specification of Letters Patent.   Patented Sept. 25, 1906.

Application filed December 11, 1905. Serial No. 291,363.

*To all whom it may concern:*

Be it known that I, GEORGE T. HACKLEY, a citizen of the United States, residing at Los Angeles, in the county of Los Angeles and State of California, have invented a new and useful Driving-Gear, of which the following is a specification.

My invention relates to a driving-gear which is especially adapted for motor-vehicles and the like; and the object of the invention is to provide a driving-gear which has but few parts, which is simple in construction, and easily controlled.

Another object is to provide a driving-gear which is practically noiseless in operation.

Another object is to secure direct transmission of power from the engine to the driven shaft without the use of rotating gears or fly-wheels, which absorb power on account of friction between teeth and also on account of the friction in the bearings, which is frequently excessive, owing to the difficulty of maintaining the shafts properly in line.

Another object is to provide a driving-gear through which various speeds may be given to the driven shaft, not only maximum and minimum speeds, but every possible degree of speed between those limits, the most minute variations being secured. The speed of the vehicle may be regulated while the driving-gear is in operation, even at the highest speed of the engine, with the greatest of ease without shock to any of the parts, the change not being a sudden jump from one set speed to another, but a gradual glide and smooth transformation. The variation which may thus be secured ranges from zero, when no motion is imparted to the driven shaft, to the maximum speed attained by the engine.

Another object is to provide a mechanism whereby the entire variation from zero, or the point at which no energy is imparted to the driven shaft, to the maximum speed of the driven shaft may be obtained by a single lever.

Another object is to provide a driving-gear in which there is a minimum of movement and friction of parts of the gear intermediate of the engine and the driven shaft.

The driving-gear is particularly adapted for use in connection with a free-piston engine which is double-acting; and another object is to provide means whereby a continuous and even application of energy to the driven shaft is secured.

Figure 4:
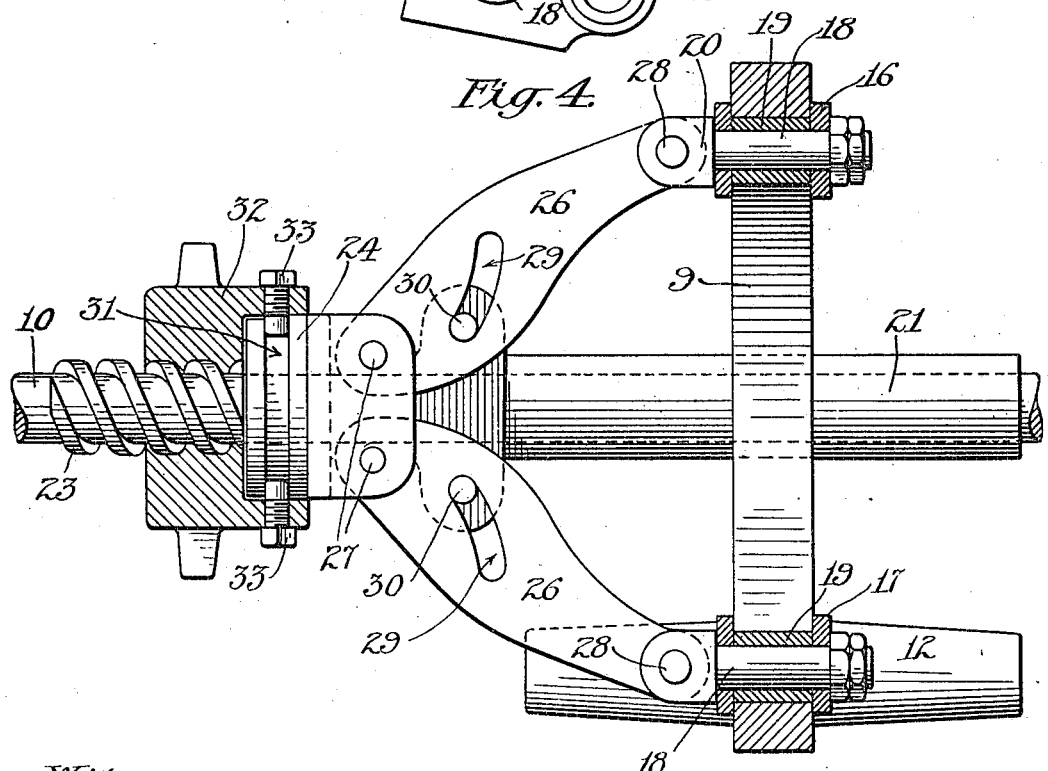

Referring to the drawings, Figure 1 is a side elevation of a motor-vehicle equipped with the driving-gear, the nearest wheels being removed, together with some of the frame. Fig. 2 is a plan view of the driving-gear detached from the vehicle. Fig. 3 is a side elevation of the link and adjacent parts. Fig. 4 is a front elevation, partly in section, of the parts shown in Fig. 3. Fig. 5 is a plan view of what is shown in Fig. 3. Fig. 6 is a side elevation of one shifting mechanism. Fig. 7 is a plan view of the same detached from the vehicle. Fig. 8 is a front elevation in detail of the shift-sleeve. Fig. 9 is a side elevation of a power-transmitting clutch with its side plate removed.

The invention comprises a link which is rocked by an engine and a device for converting a variable reciprocatory movement into a rotary movement—such a device, for instance, as a roller-clutch connected with the link by one or more radius-rods and means for adjusting the radius-rods along the link.

In Fig. 1 the mechanism is shown applied to a motor-vehicle of the touring-car type, in which 1 is the body of the car, supported by the frame 2. 3 and 4 designate front and rear wheels, respectively. 5 designates the driven shaft, which in the present embodiment is equipped with a pair of power-transmitting clutches 6 and 7. The clutches 6 and 7 may be reversible, so that propulsion of the vehicle in both directions may be secured. 8 designates a double-acting free-piston internal-combustion engine which is suspended from the frame 2. 9 is a link which is centrally pivoted on a stationary shaft 10, which is supported by brackets 11. The lower end of the link is provided with a boss 12, in which is mounted a pin 13. 14 represents trunnions carried by the piston-rod of the engine, which are connected with the pin 13 by rods 15. 16 and 17 are radius-rods pivotally attached to the respective clutches 6 and 7. The forward end of each radius-rod is adjustably connected with the link 9, each radius-rod being preferably forked and straddling the link. Pins 18 pass through squared bushings 19, which are slidably mounted in the slot in the link, and through the respective forked ends of the radius-rods. Each pin 18 is provided with a slotted head 20, which takes against one member of the fork of the radius-rod, there being a nut on the other end of the pin which takes against the other member of the fork and holds the pin 18 in place.

The link 9 is provided with a sleeve 21, which may be forged or cast integral with the link and which has a lug 22.

The shaft 10 is provided with a double thread 23, the external diameter of which is the same as the sleeve 21, and the inner end of the thread abuts against the sleeve 21.

24 is a shift-sleeve slidably mounted on the sleeve 21 and also slidable over a part of the threaded portion of the shaft 10. The shift-sleeve 24 is provided with a slotted lug 25, which receives the ends of a pair of levers 26, the levers being attached to the lug 25 by pins 27 and being attached to the respective heads 20 by pins 28. Each lever 26 is provided with a curved slot 29, and pins 30, carried by the lug 22, project into the slots. When the shift-sleeve 24 is held stationary, the pins 30 prevent movement of the arms 26, and thus the pins 18 are held stationary with respect to the link, although when the link rocks the shift-sleeve 24, arms 26, and pins 18 move as one mass bodily. The shift-sleeve 24 may be shifted in various ways. In the present embodiment it is provided with a groove 31.

32 is a sprocket which is cupped to receive the grooved portion of the sleeve 24. The sprocket 32 is provided with internal studs comprising bolts 33, the ends of which lie within the groove 31. The sprocket 32 is threaded to engage the double thread 23, and by rotating the sprocket the shift-sleeve 24 slides over the sleeve 21 or thread 23, as the case may be. When the sprocket is turned in a direction to move the sleeve 24 to the left of the position shown in Fig. 4, the sleeve 24 will slide over a portion of the threads 23.

34 is a controlling-lever arranged in a position convenient to the chauffeur and is mounted on a shaft 35. The shaft 35 carries a sprocket 36, which is connected with the sprocket 32 by a chain 37.

By throwing the lever 34 to the position opposite that shown in Fig. 1 the sprocket 32 is moved by the thread 23 away from the link 9, which draws the shift-sleeve 24 away from the link, and as the levers 26 are drawn up the pins 30, bearing in the curved slots 29, tilt the levers 26 and draw the pins 18 toward each other until the forks of the radius-rods meet at the center of the link, at which time no longitudinal movement is imparted to the radius-rods from the link which is sufficient t actuate the power-transmitting clutches. While the pins are not exactly on a dead-center with the link, they are very close to it, and as the shaft 10 of the link lies somewhat back of the pins the movement imparted to the ends of the radius-rods is mostly vertical, their longitudinal movement being infinitesimal.

As the trunnions 14 are reciprocated by the engine the link 9 is oscillated through the medium of the connecting-rods 15, and the radius-rods 16 and 17 actuate the power-transmitting clutches. I prefer to employ two radius-rods, each of which has its working-stroke during the return stroke of the other, so that the link imparts energy to the driven shaft 5 in a continuous manner, which insures an even speed of the vehicle; but it is obvious that one radius-rod could be dispensed with and the remaining radius-rod would be sufficient to drive the machine.

Figs. 6 and 7 illustrate another mechanism for shifting the shift-sleeve 24. 39 is a bell-crank lever, one arm of which is forked and engages the groove in the shift-sleeve. The other arm is connected, through the medium of a link 40, with an arm 41, which is carried by a shaft 42, the shaft 42 being mounted in suitable brackets 43. 44 is a hand-lever for operating the shaft 42, while 45 is a sector provided with a series of small V-shaped notches which are engaged by a similarly-notched block 46. The block 46 is slidably mounted on the hand-lever 44. 47 is a finger-lever pivoted to the hand-lever and is connected by rods 48 with the block 46. The small notches permit of a close adjustment of the lever 47, and when the lever 47 is moved the shaft 42 is rocked, which rocks the bell-crank lever 39 and shifts the shift-sleeve 24, thus positioning the pins 18, and through them the radius-rods are positioned on the link 9.

The power from the engine is applied in the most direct manner to the clutches, and the only moving intermediate part is the link. The few pieces which the link carries have no movement relatively to the link, (except when being shifted,) but move bodily as one piece with the link, so that there is no friction except that between the studs 33 and sleeve 24, which is due to the rocking of the latter, and there is also a slight amount of movement and consequent friction between each radius-rod and its pin.

The curve of each of the slots 29 is arranged so that the movement of the ends of the levers 26, which are attached to the pins 18, is in a straight line toward or away from the center of the link. Thus there is no cramping of the bushings 19, and the ratio of movement between the controlling-lever 34 and the pins 18 is constant at all positions of the lever. It is thus possible to secure the most delicate adjustment of any desired speed.

When the radius-rods are shifted to the ends of the link, they are given their longest stroke and have their greatest speed, and the clutch movement is accordingly the maximum distance and speed which propels the vehicle at the highest speed. As the radius-rods are shifted toward the center of the link the amount of movement and speed of movement is lessened, and consequently the speed of the vehicle is lessened, while when the radius-rods are at the center of the link no motion is given to the clutches and the vehicle is stationary unless it be under headway, which may be checked by brake.

What I claim is—

1. In combination, a driven shaft, a pair of power-transmitting clutches thereon, a link, the pivotal line of which is parallel with the driven shaft, radius-rods connecting the clutches and the link, and means for simultaneously adjusting both of the radius-rods on the link.

2. In combination, a shaft, a link provided with a sleeve mounted on the shaft, a shift-sleeve on the first sleeve, a radius-rod, means for adjustably connecting one end of the radius-rod with the link, and means intermediate the shift-sleeve and said first means for sliding said first means along the link.

3. In combination, a shaft, a link provided with a sleeve mounted on the shaft, a shift-sleeve on the first sleeve, a pair of radius-rods, means for slidably connecting the end of each radius-rod with the link, and means intermediate the shift-sleeve and said first means for equably shifting both of said radius-rods along the link when the shift-sleeve is moved.

4. In combination, a shaft, a link provided with a sleeve mounted on the shaft, a shift-sleeve on the first sleeve, a pair of radius-rods, means for slidably connecting the ends of each radius-rod with the link, means intermediate the shift-sleeve and said first means for equably shifting both of said radius-rods along the link when said shift-sleeve is moved, said shaft being situated out of line of the path of sliding travel of the first means.

5. In combination, a pivoted link, shift means movable parallel with the axis of the link, a pair of radius-rods adjustably connected with the link, a pair of levers connected with said shift means and with the respective radius-rods, and means engaging intermediate portions of the levers for tilting said levers when the shift means is moved.

6. In combination, a shaft, a link provided with a sleeve mounted on the shaft, shift means movable parallel with the axis of said link, a pair of radius-rods adjustably connected with the link, a pair of levers connected with said shift means and with the respective radius-rods, and bosses supported by said sleeve and bearing against said levers.

7. In combination, a shaft, a link provided with a sleeve mounted on the shaft, shift means movable parallel with the axis of said link, a pair of radius-rods adjustably connected with the link, a pair of levers connected with said shift means and having slots, bosses supported by the sleeve and projecting into the slots, said slots being curved to cause the ends of the levers to have a straight path of movement.

8. In combination, a shaft, a link provided with a sleeve mounted on the shaft, shift means mounted on the sleeve, a pair of radius-rods slidably connected with the link, a pair of levers connected with the shift means and with the radius-rods, and means on the first sleeve for controlling the movement of said levers.

9. In combination, a shaft, a link provided with a sleeve mounted on the shaft, shift means mounted on the sleeve, a pair of radius-rods slidably connected with the link, a pair of slotted levers connected with the shift means and with the radius-rods, and bosses on the first sleeve projecting into said slots.

10. In combination, a pivoted link, shift means movable parallel with the axis of the link, bushings in the link, pins through the bushings, a pair of radius-rods connected with the pins, a pair of levers connected with the shift means and with said pins, and means for controlling the action of said levers when the shift means is moved.

11. In combination, a pivoted link, shift means movable parallel with the axis of the link, squared bushings in the link, pins with slotted heads mounted in the bushings, a pair of levers connected with the slotted heads and with the shift means, a pair of radius-rods connected with the pins, and means for controlling the action of the levers when the shift means is moved.

12. In combination, a shaft having a screw thereon, a link provided with a sleeve mounted on the shaft, a shift-sleeve on the first sleeve, a sprocket mounted on the screw and engaging the shift-sleeve, a pair of radius-rods connected with the link, connections between the radius-rod and the shift-sleeve, and means for rotating the sprocket.

13. In combination, a shaft having a screw thereon, a link provided with a sleeve mounted on the shaft, a shift-sleeve mounted on the first sleeve, a sprocket mounted on the screw and engaging the shift-sleeve, a pair of radius-rods connected with the link, connections between the radius-rods and the shift-sleeve, and a controlling-lever connected with the sprocket.

14. In combination, a shaft, a link provided with a sleeve mounted on the shaft, a shift-sleeve mounted on the first sleeve, a pair of radius-rods, means for slidably connecting the ends of the radius-rods with the link, means intermediate the shift-sleeve and said first means for equably shifting both of said radius-rods along the link when the shift-sleeve is moved, there being a screw on the shaft, a sprocket on the screw engaging the shift-sleeve, and a controlling-lever connected with the sprocket.

15. In combination, a pivoted link, shift means movable parallel with the axis of the link, squared bushings in the link, pins with slotted heads in the bushings, a pair of levers connected with the slotted heads and with the shift means, a pair of radius-rods connected with the pins, means for controlling the action of the levers when the shift means is moved, there being a screw on the shaft, a sprocket on the screw and engaging the shift means, and a controlling-lever connected with the sprocket.

16. In combination, a link provided with a sleeve, a shaft through the sleeve, radius-rods connected with the link, means for shifting the radius-rods embracing a shift-sleeve having an annular groove and a slotted lug, levers connected with the slotted lug and with the radius-rods, there being a screw on the shaft, and rotatable means on the screw carrying studs which lie in the annular groove.

In testimony whereof I have hereunto set my hand, at Los Angeles, California, this 5th day of December, 1905.

GEORGE T. HACKLEY.

In presence of—
ARTHUR P. KNIGHT,
F. A. MANSFIELD.